United States Patent [19]

Lechner

[11] 4,064,952

[45] Dec. 27, 1977

[54] DEVICE ATTACHABLE TO POWER DRILLS FOR REMOVAL OF MATERIAL RELEASED DURING DRILLING

[76] Inventor: Helmut Lechner, 3590 Forellenweg 1, Bad Wildungen-Wega, Germany

[21] Appl. No.: 660,709

[22] Filed: Feb. 23, 1976

[30] Foreign Application Priority Data

Feb. 28, 1975 Germany .................. 7506186[U]
Apr. 23, 1975 Germany .................. 2517926

[51] Int. Cl.² .......................................... E25D 17/14
[52] U.S. Cl. ................................ 175/209; 137/43; 175/218
[58] Field of Search ..................... 175/207–212, 175/218; 173/75; 137/43, 533.11

[56] References Cited

U.S. PATENT DOCUMENTS

| | | | |
|---|---|---|---|
| 1,057,733 | 4/1913 | Hansen | 175/218 |
| 1,664,786 | 4/1928 | Mumovich | 175/209 |
| 2,595,715 | 5/1952 | Sloan | 175/212 |
| 2,596,670 | 5/1952 | Francis et al. | 175/209 |
| 2,634,952 | 4/1953 | Brinkley | 175/209 |
| 2,771,271 | 11/1956 | Lawson, Sr. | 175/209 |
| 3,339,435 | 9/1967 | Heitz | 175/211 X |
| 3,456,740 | 7/1969 | Pawle et al. | 173/21 X |
| 3,500,843 | 3/1970 | White | 137/43 |
| 3,511,322 | 5/1970 | Bixby et al. | 173/75 |
| 3,610,263 | 10/1971 | Walters | 137/43 |
| 3,850,254 | 11/1974 | Hydes | 173/75 |

*Primary Examiner*—Ernest R. Purser
*Assistant Examiner*—William F. Pate, III
*Attorney, Agent, or Firm*—Max Fogiel

[57] ABSTRACT

A device attachable to a power drill for the collection and removal of material released during drilling procedures. A collecting tube is mounted by a clamp parallel to the longitudinal axis of the power drill, and is movable relative to the power drill. A spout surrounds the drill bit near the tip area. Pressure is applied to the collecting tube or to the spout in closing the drill bit by a spring, so that the collecting tube can have relative motion in the opposite direction, in accordance with the progress of the drilling. The collecting tube is adapted to the contour of the power drill and has a bend in the vicinity of the spout. The collecting tube has, furthermore, a storage space for the material released during the drilling.

26 Claims, 2 Drawing Figures

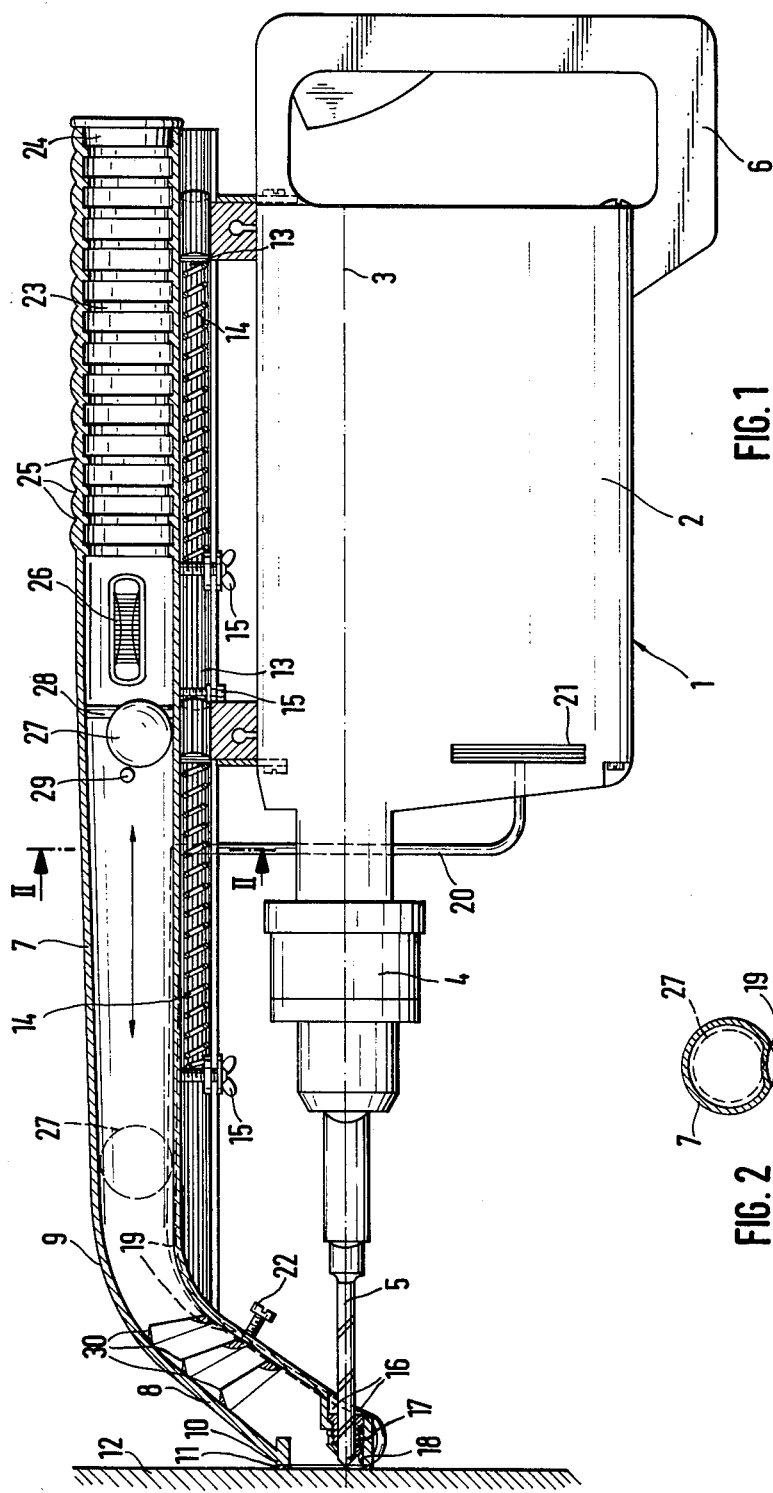

DEVICE ATTACHABLE TO POWER DRILLS FOR REMOVAL OF MATERIAL RELEASED DURING DRILLING

BACKGROUND OF THE INVENTION

The present invention relates to an accessory device attachable to power drills for the collection and removal of material released during drilling. The device can be used with power drills, and also with hammers and other impact power tools where, during operation, material such as drilling dust, chips, etc. is released.

When working with such devices, considerable dust formation takes place. In closed inside areas this leads to dirt formation in the room and dust deposition on the objects, and to interference with the operator of the tool. This is the case in particular when, for example, holes must be drilled vertically upward into the ceiling for fastening curtain rods.

There is already known in the art a device for catching the materials formed during drilling. It consists of a pleated bellows which encloses the power drill and the drill chuck coaxially with the longitudinal axis of the power drill. However, usage of this device is advantageous only when the drilling is to be vertically upward. The material released drops into the collecting space between pleated bellows and the power drill machinery. There it leads to contamination and to damage of other parts. Also, using this device is cumbersome.

It is, therefore, an object of the present invention to improve the state of the art and to provide an accessory device for power drills of the above-described type which makes it possible to receive the material released during drilling so that it is collected and removed in a controlled manner.

Another object of the present invention is to provide a device of the foregoing character which may be economically fabricated and maintained in service.

A further object of the present invention is to provide a device, as described, which has a substantially long operating life.

SUMMARY OF THE INVENTION

The objects of the present invention are achieved by providing a collecting tube which is mounted via a guide arrangement parallel to the longitudinal axis of the power drill and can be moved relative thereto. The collecting tube has a spout which encloses the drill bit in the vicinity of its tip. This provides the possibility to pick up the material, released during drilling, at the spout end of the collecting tube, and to pass it to the collecting tube where it can be stored or otherwise removed. It is important that the collecting tube be mounted with motion relative to the power drill, so that its tip may always enclose the drilled hole and the drill bit still can further deepen the hole.

The collecting tube or at least the spout enclosing the drill bit is under the action of a spring in the drilling direction and can be moved in the opposite direction in accordance with the drilling process. The spring tension provides for forcing the spout end against the drill hole so that the gap prevailing there is always very small, in order to collect most of the material released during drilling in the collecting tube.

The collecting tube is adapted to the outline of the power drill and has a bend in the vicinity of the spout. This results in a handy device which does not in any way interfere with the drilling. The collecting tube has a storage space for the material released during drilling. This storage space can have many forms. Ordinarily, it is sufficiently large so that the material from many holes may be accommodated in the storage before it has to be emptied. The storage space has an expedient closure which permits emptying the contents in the open position. Other designs are also possible.

In particular, the collecting tube may be designed as a suction tube and may have at the end facing away from the spout a connection for a vacuum air source, particularly a vacuum cleaner. This makes it possible to withdraw the material formed during drilling with a suction air source located away from the drilling located, resulting thereby in better operation. The collecting tube itself may have space for inserting a dust bag so that it is possible to connect with a hose, the collecting tube end which faces away from the spout, to the suction side of the fan of the power drill. In that case, the dust must be separated in a dust bag in the collecting tube to prevent it from contact with the fan and with those parts of the power drill which are to be cooled. Of course, the dust separation can also be accomplished in a vacuum cleaner of standard design. To achieve this, it is only possible to connect the end of the collecting tube to such a vacuum cleaner.

To facilitate handling, a return closure is provided in the spout or in the collecting tube. This prevents the material collected in the storage of the collecting tube from falling out through the spout end facing the drill bit. For example, the return closure is designed as a movable flap blocking the inside cross-section of the collecting tube or its parts. The return closure can also have the form of a ball blockage. Various constructions are possible to solve this problem.

The spout of the collecting tube terminates in a surface perpendicular to the drill bit, since in the majority of operations, the hole must be drilled in a perpendicular direction. At its end, the spout has a hole which allows passage of the drill bit so that the drill bit protrudes from the outside through the spout wall into the inside of the spout or of the collecting tube. The hole may have an edge flare directed towards the inside of the spout, so that the material released while drilling cannot exit through this hole, but is collected in the storage space of the collecting tube. A dust seal, preferably a brush seal, is insertable in the hole in the spout. Of course, for different drill diameters, different dust seals may be provided; they can be threaded or otherwise fastened in the spout hole.

For improved sealing between spout end and the wall surface in which the hole is to be drilled, the spout end has a gasket of elastically resilient material, particularly rubber. This gasket prevents damage to the collecting tube and to the wall surface.

Even though the collecting tube is clamped once or several times to the power drill, the hole in the drill bit vicinity can also be designed as an additional guide for the collecting tube. It is recommended that the guide clamp be adapted to the drill bit and be made of a bearing material.

The hole in the spout for passing the drill bit is expediently made eccentric with the spout end, so that good visibility prevails at the drilling site. Also, this measure facilitates better removal of the material released during drilling. For example, inside the collecting tube, in the vicinity of the guide in the collecting tube for the drill bit, there may be nozzles terminating a venting channel in order to keep the material released during drilling away from the hole in the spout, or from the guide in the collecting tube. The venting channel may be connected to the blowout opening of the fan of the power drill. It is expediently equipped with a quantity regulation adjustment which must be set so that the material released during drilling is kept away from the hole or collecting tube guide, but is not forced outside near the spout end surrounding the drill hole.

In the area of the spout end facing the drill bit, particularly near the bend, there are dust retaining rings which retain fine material that is not being caught by the return closure or has not yet traveled to that area, even when the power drill is held downward. The return closure or the ball blockage is advantageously equipped with a locking device for the closure or the ball in the open position, so that, even when drilling downward, the material released can be collected and lifted.

Grips, griplike depressions or such for manually grasping and shifting in relation to the power drill are provided on the collecting tube. This facilitates handling.

The storage space may be divided by ribs in order to be adaptable to power drills of different lengths or to have available different adapter cross-sections for vacuum cleaners to be connected thereto.

The tension of the spring pressing the collecting tube or its spout end forward is adjustable to facilitate adaptation to the prevailing drilling conditions. The relative-motion mounting of the collecting tube may also be used to equip the power drill with a depth gage, or an indicating device for the depth of the hole to be drilled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic sectional view of the accessory device attached to a hand drill; and FIG. 2 shows a section taken along line II—II of FIG. 1.

DESCRIPTION OF THE PREFERRED EMBODIMENTS

The power drill 1 is equipped in the conventional manner. It comprises a housing 2 in which the driving unit is located along longitudinal axis 3. Along the longitudinal axis 3 is the drill chuck 4 which holds the drill 5. Handle 6 is used to hold the power drill.

The accessory device comprises the collecting tube 7 which may be in one piece or have several parts and which comprises a spout 8 located on that end of collecting tube 7 which faces drill bit 5. A suitable bend 9 is provided. The end 10 of spout 8 is perpendicular to that longitudinal axis 3. On this end is a gasket 11 made of resilient elastic material to seal off the location on the wall surface 12 where the hole is to be drilled.

The collecting tube 7 is mounted by one or more clamps 13 on the housing 2 of the drill press so that the collecting tube 7 and the spout end 10 can move during the drilling process while the drill 5 drills the hole. There are one or several springs 14 which press the end 10 of spout 8 against wall 12 during the drilling. The tension of springs 14 can be adjusted by wing nuts 15. FIG. 2 shows the cross-section of clamp 13. Of course, the collecting tube 7 may also be fastened to have relative motion along the drill press.

The collecting tube 7 and spout 8 in the region facing drill bit 5 have a hole 16 so that drill bit 5 can enter the spout's end from the outside and can perform its drilling function on the inside. Dust gasket rings 17 can be inserted into holes 16 which is eccentric with the circular surface on end 10 of spout 8. They may be brush gasket rings whose inside diameter is adapted to the diameter to be drilled. But it is also possible to form here an additional guide for the collecting tube and to screw in an insert made of a bearing material. Adjacent to the hole 16, there are provided in the interior of collecting tube 7, the nozzles 18 which are fed via a venting channel 19 that runs for a predetermined distance along or inside the collecting tube 7. This venting channel is continued in a hose 20 which can be connected to the blowout stub of fan or vent 21 of the power drill. In order to regulate the air quantity, a screw 22 can be threaded into the cross-section of the venting channel 19. This venting channel and the nozzles 18 have the task of supplying air in the vicinity of hole 16 in order to prevent material freed during the drilling from settling at hole 16 or parts in the vicinity thereof, or from exiting through a possible crack. The air blown in exerts a predetermined suction effect on the released material and transports it in the direction of collecting tube 7. From there is gets into the storage space 23 at the end of the collecting tube 7. The storage space 23 may be closed by a stopper 24 or may be connected via a connecting line to a vacuum cleaner or another source of suction air. That part of the collecting tube 7 which surrounds the storage space 23 is equipped with ribs 25 which make it possible to lengthen the collecting tube 7 in accordance with the outlines (dimensions) of power drill 1.

In the approximate center of the collecting tube 7 there are griplike depressions which are used for grasping the collecting tube 7.

On the other side of stopper 24, the storage space is bounded by a return closure which, in the example shown, is a ball blockage. The ball 27 is shown as a solid line in the open position and as a broken line in the closed position. The inside diameter of the collecting tube 7 is dimensioned accordingly. In the open position, the sphere (ball) rests against two pins 28 which prevent the ball from entering the storage space 23. The ball 27 can be locked in the open position. This is accomplished by pin 29 which can be inserted laterally through the collecting tube 7.

In the area of the bend, the collecting tube 7 has dust retaining rings 30 which are lip-shaped and are located inclined to the rear (bent backwards).

The accessory device in accordance with the present invention is used as follows:

The collecting tube 7 is fastened with clamp 13 to the power drill 1. This is done by locating the collecting tube 7 by means of a clamp guide 13 so that it can move parallel to longitudinal axis 3. Springs 14 apply a force to the collecting tube 7 in the drill direction. After inserting the drill 5 in drill chuck 4 and after inserting the associated dust gasket ring 17 in the hole 16, the collecting tube 7 is manually pulled backwards by grasping the griplike depressions 26 so that the drill 5 with its tip projects beyond the end 10 of spout 8. In this position, the drill can be applied where the hole is to be drilled in wall surface 12. If it is, for example, a room ceiling where a curtain rod is to be fastened, the ball 27, because of gravity, is already in contact with the pins 28, i.e., in the open position. By releasing the collecting tube 7, the springs 14 push it against the wall surface 12 so that the gasket 11 seals and encloses the drill hole. The drill motor can now be started so that the drilling process proceeds. Due to the contact pressure, the collecting tube 7 is moved rearward relative to the power drill. The material released during the drilling, due to gravity, drops into the collecting tube 7 or into storage space 23. Through the venting channel 19, air gets to nozzles 18 which exits there and prevents material released during the drilling from falling through the hole 16.

Of course, at this time the stopper 24 is closed or the storage space 23 is connected to a vacuum cleaner. Now several holes may be drilled one after the other, because the storage space 23 is relatively large. On the other hand, it is also possible to take the drill press down and to point it with the drill tip downward, in order to change the work location. Here the return closure comes into play. Due to gravity, the ball 27 assumes the closed position and prevents the contents of storage space 23 from pouring through the spout 8 which is open in the front. If slight material remainders should still be present near the bend 9 or if the ball 27 does not close tightly, the dust retaining rings 30 prevent the dust from exiting.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended with the meaning and range of equivalence of the following claims.

I claim:

1. A device attachable to a power drill for the collection and removal of material released during drilling comprising, in combination, a collecting tube; clamp means for mounting said tube parallel to the longitudinal axis of the power drill, said power drill having a drill bit; and a spout surrounding the drill bit in proximity of the tip area of the drill bit; ball closure means forming a return closure in said spout; and locking means on said ball closure means for holding said closure means in open position.

2. The device as defined in claim 1 including spring means for applying pressure to said collecting tube, said collecting tube having relative motion in the opposite direction following the progress of drilling.

3. The device as defined in claim 1 wherein said collecting tube has a bend in the vicinity of said spout, said collecting tube conforming to the contour of said power drill.

4. The device as defined in claim 1 wherein said collecting tube has a storage space for material released during drilling.

5. The device as defined in claim 4 including stopper in said storage space for discharging the contents of said storage space in the open position of said stopper means.

6. The device as defined in claim 1 including connection means for a suction air source, particularly a vacuum cleaner, on said collecting tube at the end facing away from said spout, said collecting tube comprising a suction tube.

7. The device as defined in claim 6 including means in said collecting tube for insertion of a dust bag.

8. The device as defined in claim 6 including cooling means in said power drill; and pipe means for connecting the end of said collecting tube facing away from said spout to said cooling means, said cooling means comprising fan means with suction side connected to said collecting tube.

9. The device as defined in claim 1 wherein said return closure means comprises a movable flap blocking the open cross-section of said spout.

10. The device as defined in claim 1 wherein said spout terminates in a surface perpendicular to said drill.

11. The device as defined in claim 1 wherein said spout has near its end a hole for the passage of the drill bit.

12. The device as defined in claim 11 wherein said hole has an edge flare directed towards the interior of said spout.

13. The device as defined in claim 11 including dust sealing means surrounding said drill bit and insertable into said hole.

14. The device as defined in claim 1 including gasket means of elastically resilient material at the end of said spout.

15. The device as defined in claim 1 wherein said spout surrounding said drill bit near the tip comprises a guide for said collecting tube.

16. The device as defined in claim 11 wherein said hole in said spout is located eccentrically in relation to the end of said spout for passage of the drill bit.

17. The device as defined in claim 11 including nozzle means inside said collecting tube in proximity of said clamp means, said nozzle means terminating in a venting channel for preventing material released during drilling from reaching said hole.

18. The device as defined in claim 17 including quantity regulating means in said venting channel.

19. The device as defined in claim 3 including dust retainer rings in the vicinity of the end of said spout and in the vicinity of said bend.

20. The device as defined in claim 1 including depression means on said collecting tube for manually grasping and displacement of said tube relative to said drill.

21. The device as defined in claim 4 including rib means for dividing said storage space to adapt to power drills of different lengths.

22. The device as defined in claim 2 including tension adjustment means for said spring means.

23. A device attachable to a power drill for the collection and removal of material released during drilling comprising, in combination, a collecting tube; clamp means for mounting said tube parallel to the longitudinal axis of the power drill, said power drill having a drill bit; and a spout surrounding the drill bit in proximity of the tip area of the drill bit; spring means for applying pressure to said collecting tube in the direction of drilling; a ball valve member in said collecting tube for forming a return closure; said collecting tube having a tapered portion for seating said ball valve member; and means abutting said ball valve member for holding said ball valve member in open position.

24. A device as defined in claim 23 including means for holding said ball valve member in open position.

25. A device as defined in claim 24 wherein said means for holding said ball valve member in open position comprises pin means extending through said collecting tube.

26. The device as defined in claim 23 including dust retaining rings in the region of an end of said spout facing said drill and in the region of a bend of said collecting tube.

* * * * *